United States Patent Office

2,963,463
Patented Dec. 6, 1960

2,963,463

COMPOSITION CONTAINING REACTION PRODUCTS OF BUTADIENE AND FURFURAL AND PRODUCTS OF FURFURAL AND KETONES

Mortimer T. Harvey, South Orange, and Peter L. Rosamilia, Newark, N.J., assignors to Harvel Research Corporation, a corporation of New Jersey No Drawing. Filed Aug. 29, 1957, Ser. No. 680,907

4 Claims. (Cl. 260—45.5)

This invention relates to novel compositions of matter and to methods for producing them. More particularly, the invention is directed to novel compositions comprising Materials (II) butadiene-furfural organic reaction products combined with various Materials (I) ketone-furfural reaction products, derivatives thereof, and furfural alcohol-formaldehyde reaction products with or without the use of heat and/or in the presence of a catalyst. In one of its specific aspects the invention is directed to such combinations in which Materials (I) and (II) are concurrently and simultaneously polymerized or copolymerized to provide novel and useful products finding application in a number of different fields. The butadiene-furfural organic products employed in the practice of this invention are such Materials (II) having softening points (ball and ring) no greater than 200° F. Throughout the present description and claims, the term butadiene is and shall mean the compound butadiene 1,3.

Prior to this invention butadiene was reacted with furfural under varying conditions to provide a wide variety of compositions, all of which contained Material (II).

Among some of said Materials (II) which may be employed as starting materials in the practice of this invention, are (IIA) substantially pure 2,3,4,5-bis ($\Delta^2$-butenylene)-tetrahydrofurfural, as well as homopolymers thereof, and other compositions in which said compound and/or its polymers is present as a component in varying degrees of concentration and together with other organic compounds produced with furfural and/or butadiene under the particular reaction conditions employed.

Other Materials (II) which may be employed in the practice of this invention are those disclosed in a number of issued patents known to the art and made part hereof. Among them are (IIB) light colored, liquid organic reaction products of furfural and butadiene having an average molecular weight of about 210, fractions thereof having boiling points in the temperature range of 200–320° F. at an absolute pressure of 1 mm. of mercury pressure. Such reaction products and methods for producing them are disclosed in the U.S. patent to Herbolsheimer 2,483,903 issued on October 4, 1945.

Still other examples of such Materials (II) are (IIC) the tarry by-products or residues obtained by Herbolsheimer in practising the method disclosed in said patent.

Still other examples of said Materials (II) are (IID) the dark colored tarry residues obtained in the reaction of furfural and butadiene and varying in consistency from practically solid, semi-solid to fairly fluid light colored liquid masses. Such masses are composed chiefly of complex mixtures of reaction products of butadiene and furfural in various molecular proportions generally 1:1 and/or 2:1 and with a substantial part being in polymeric form, and also (IID) which either under atmospheric pressure or subatmospheric pressure, which may be as low as 5 mm. of mercury pressure and generally 5–125 mm. of mercury pressure, is heated to and maintained at a temperature in the range of 250–450° F. either in the presence or absence of an alkaline or acidic catalyst until the quantity by weight thereof measures at least 60% of that of the original mass of (IID) and the average molecular weight thereof is at least 660 and its viscosity at 25° C. is such that a solution of 5 parts thereof in 10 parts of furfural has a viscosity at least 4 times that of a solution consisting of 5 parts of (IID) in 10 parts of furfural and has a softening point (ball and ring) no greater than 180° F. Such end products are known herein as (IIE) and in general may be characterized as homopolymerized (IID).

Still other examples of Materials (II) are (IIF), the dark colored tarry residues which may vary in consistency from dark practically solid, semi-solid to fairly fluid lighter colored liquid masses which are complex mixtures of reaction products of butadiene and furfural and are by-products formed during the extractive distillation of a $C_4$ hydrocarbon mixture containing butadiene, employing furfural as the selective solvent and are generally known to the art as residues formed in the furfural extractive distillation method for the purification of butadiene. (A report on such residues, which the authors term "polymeric residue formed in the furfural extractive distillation method for the purification of butadiene" appears in an article entitled "Butadiene-Furfural Copolymers" by Hillyer et al., Ind. and Eng. Chem., vol. 40, Nov. 1948, pps. 2216–2220, reference to which is hereby made.)

Still other examples of Materials (II) are (IIG) which are the materials produced by homopolymerizing (IIF) using the same methods as those set forth for the homopolymerization of (IID) to obtain (IIE).

The materials (II) preferably employed in the practice of this invention are (IIC)–(IIG) some of which are liquid and others solid at 70° F. but all of which have average molecular weight of at least 330, viscosity at 25° C. of at least 2,000 cp., are soluble in furfural, and have a softening point (ball and ring) of at least 60° F. and no greater than 180° F.

In general, the amount of alkaline agent employed in order to effect the homopolymerization is such that it is sufficient to increase the pH of the mass to be polymerized to a value of at least 8, but may be as high as desired, depending upon the speed of reaction required. In factory practice, we prefer to carry out said polymerization at a pH in the range of approximately 8 to approximately 12 although higher pH conditions, as high as 13.5, may be employed. (The method for measuring pH wherever it occurs throughout the present description is to place 10 grams of the materials whose pH is to be determined in 100 grams of distilled water, heat the mixture to boiling while stirring, allow to cool to room temperature and take the pH by means of pH papers. The pH papers employed were those known as "Hydrion.") Said pH conditions in the range of approximately 8–13.5 are established at the beginning and reduced in the course of polymerization. Among some of the alkaline agents which may be employed in the practice of this invention are sodium hydroxide, potassium hydroxide, calcium hydroxide, etc., diethylene triamine, triethylene tetramine, ethanolamine, propylene diamine, 1,6-hexamethylene diamine, tetraethylene pentamine, etc.

When acidic agent is employed for homopolymerization, there is used an acidic agent in amount equal to the acidic polymerizable equivalent of at least one part by weight of sulfuric acid for each 200 parts of the Materials (II) to be polymerized. The quantity and nature of the acidic agent employed in such that the pH of a mixture of the acidic agent and Material (II) to be polymerized is lowered to a value no greater than approximately 3.5, but may be as low as desired, depending upon the speed of reaction required. In factory practice, said polymerization is carried out at a pH in the range of 1.5 to approximately 3.5. Among some of the acidic agents which may be employed for effecting said polymerization are sulfuric acid, hydrochloric acid, phosphoric acid, fluoroboric acid, boron trifluoride, paratoluene sulfonic acid, alkyl sulfates such as the mono- and dialkyl sulfates, mono- or di-methyl, ethyl, propyl, etc., sulfates, phosphates, etc.

While various methods for producing Materials (II) may be employed, we shall set forth herein a number of illustrative examples which shall be sufficient for illustrating said Materials (II) which are employed as starting materials in the practice of this invention. The following Examples A–H are given by way of illustration and not limitation of such Materials (II) and methods for producing them, all parts being given by weight unless otherwise specified.

*Example A*

There is collected and obtained a batch of what is termed the "polymeric residue former in the furfural extractive distillation method for the purification of butadiene." This raw residue which is a waste product or a by-product, generally is physically combined with water and therefore the batch is first placed in an oven and maintained at elevated temperature for about 15 hours for substantially complete dehydration and the resultant substantially dehydrated mass is hereinafter known as Material IIK–A. The dehydration may be effected at atmospheric pressure and at temperatures of approximately 200–220° F.

*Example B*

If desired, said original raw residue of Example A may be heated under either atmospheric or reduced pressure conditions to substantially completely dehydrate the mass at temperatures in the range of about 200–450° F. When the higher temperatures in said range are employed, furfural-butadiene reaction products come off as a distillate and are collected and are hereinafter known as Materials IIK–B, leaving behind residual mass which is substantially completely dehydrated and having had said fraction removed at least in part therefrom, with said residual mass measuring at least 60% by weight of said dehydrated residue. Such dehydrated residual masses are also obtainable from said raw residue when said residue is maintained at the higher temperature of said range while under subatmospheric pressure of 5–125 mm. of mercury pressure. Said dehydrated residues, as well as said distillants and the residual masses of said residues in all cases have a molecular weight of at least 330, a viscosity of at least 2,000 cp. at 25° C., a softening point (ball and ring) of at least 60° F. and no greater than 180° F. and are soluble in furfural.

*Example C*

Into an oven maintained at 260–280° F. was placed a steel drum containing 485 lbs. of raw residue obtained as a by-product in the purification of butadiene in which the furfural extractive distillation method was employed. Said residue is allowed to stand in that oven for a period of about 15–18 hours whereupon the residue was substantially completely dehydrated and somewhat higher volatiles originally contained therein had been driven off. At the end of that period, the mass in the container was still fluid at room temperature and is hereinafter known as Material IIK–C.

*Example D*

Into a closed vessel is charged 500 lbs. of raw residue obtained as a by-product in the purification of butadiene in which the furfural extractive distillation method was employed. While under a vacuum of about 28″ of mercury, the temperature of the raw residue is elevated slowly over about 1 hour period until it reached 215° F. and then the source of heat was removed and vacuum broken. The resultant dehydrated mass is thick, but pourable at room temperature and is hereinafter known as Material IIK–D. In the course of heating, said raw residue under such subatmospheric conditions, a distillate was recovered and consisted mainly of water with a small amount of light volatiles. If desired, while under the same degree of vacuum, the mass may be further heated and maintained at a temperature of 325–350° F. whereupon more volatiles come off and the remainder is so thick or polymerized that a sample thereof when cooled to room temperature had a softening point (ball and ring) of 130–180° F. depending upon the time of heating, and such product is known as Material IIK–DI.

*Example E*

800 lbs. of raw residue was another illustrative raw material used. The raw residue was the water-laden residue obtained as a by-product or waste product in the purification of butadiene in which the furfural extractive distillation method was employed. This particular residue was quite heavy and a layer of water had separated out and floated on top of the residue. Most of the water layer was dipped off. Then to the residue which still contained an appreciable quantity of water, was transferred to a kettle, there was added an aqueous solution consisting of 8 lbs. of sodium hydroxide in 8 lbs. of water and the mass was agitated to distribute the sodium hydroxide throughout the residue. Then the mass was heated to a temperature of approximately 320–340° F. and maintained at that temperature while under subatmospheric conditions and a pressure of approximately 5–125 mm. of mercury pressure to substantially completely dehydrate the residue and to polymerize it to a softening point (ball and ring) of 165° F. This polymerized product so produced is solid at room temperature, but at 180° F. is liquid, that is it will flow and such polymerized product is hereinafter known as Material IIK–E.

*Example F*

Into an oven maintained at 260–280° F. was placed a steel drum containing 485 lbs. of raw residue obtained as a by-product in the purification of butadiene in which the furfural extractive distillation method was employed. Said residue is allowed to stand in that oven at that temperature for a period of about 15–18 hours whereupon said residue was completely dehydrated and some of the higher volatiles originally contained therein had been driven off. At the end of that period the mass in the container was a dark, thick, yet fluid mass. This product is hereinafter known as Material IIK–F. The entire mass may be transferred to a closed kettle, vented to the atmosphere through which distillates may pass and be collected, and heated to approximately 425° F. and maintained at that temperature for approximately 2 to 5 hours. Then the source of heat may be removed and the resultant mass poured into pans and allowed to cool to room temperature. At this temperature the mass will be a thermoplastic solid, insoluble in hot and cold V.M.P. naphtha and will have softening point (ball and ring of 170° F. and consists chiefly of a highly polymerized reaction mass. This product is hereinafter known as Material IIK–FI. All distillates are collected and combined and then dehydrated at 220° F. while under 28″ vacuum. The dehydrated combined distillates are known as Materials IIK–F2. To the combined distillates either dehydrated or not and preferably the dehydrated mass has added thereto a solution consisting of 33 parts by weight of potassium hydroxide in 66 parts by weight of water. The quantity of said solution added is equal to 10 parts thereof to 100 parts of said distillate on a dry basis. The mass is mixed together and heated up to and maintained at 300° F. while being stirred and under such conditions after 13–14 hours is polymerized to such a degree that when cooled to room temperature it is a thermoplastic solid having a softening point (ball and ring) of approximately 180° F. and this product is known hereinafter as Material IIK–F3.

To 100 lbs. of Material IIK–F were mixed 6 lbs. of an aqueous solution consisting of 2 lbs. of sodium hydroxide in 4 lbs. of water. The mix was heated to and maintained at approximately 300° F. under atmospheric conditions until a solution of a 10-gram sample thereof at 25° C. dissolved in 5 grams of furfural had a viscosity at 25° C. about 4 times that of a solution of a 10-gram sample of the original Material IIK–F dissolved in 5 grams of furfural. At this stage the mass is quickly cooled and there is added thereto an agent to neutralize the alkaline catalyst, if desired, and the polymerized product is hereinafter known as Material IIK–F4.

Example G

To the combined distillates Material IIK–F2, either dehydrated or not and preferably in dehydrated condition, may be added about 10 parts of a 45% aqueous solution of fluoboric acid for each 100 parts of said dehydrated distillate. The mass is mixed together and maintained at 350° F. and under such conditions, until the viscosity of the mass at 25° C. was 20,000 cp. and this product is known hereinafter as Material IIK–G.

To 100 lbs. of Material IIK–F were mixed 15 lbs. of concentrated aqueous hydrochloric acid. The mix was heated to and maintained at approximately 290° F. until a solution of a 10-gram sample thereof at 25° C. dissolved in 5 grams of furfural had a viscosity at 25° C. about 2 times that of a solution of a 10-gram sample of the original Material IIK–F dissolved in 5 grams of furfural. At this stage the mass is quickly cooled and there is added thereto an agent to neutralize the acidic catalyst and the polymerized product is hereinafter known as Material IIK–G1.

Example H

Into a closed vessel is charged approximately 500 lbs. of raw residue obtained as a by-product in the purification of butadiene in which the furfural extractive distillation method is employed. While under a vacuum of about 28″ of mercury, the temperature of the raw residue is elevated slowly over about 1 hour period until it reaches approximately 215° F., then the source of heat is removed and the vacuum is broken. The resultant mass weighs approximately 375 lbs., is thick but pourable, has a molecular weight above 330, a viscosity about 2,000 cp. at 25° C. and is soluble in furfural and has a softening point (ball and ring) above 60° F. The material which distilled over during the course of that heat treatment under vacuum was collected and consisted mainly of water together with a small amount of light volatiles. This product, said 375 lbs. mass, is hereinafter known as Material IIK–H.

If desired, while under the same degree of vacuum, the mass may be further heated and maintained at a temperature of 325–350° F. whereupon more distillate comes off, the distillate collected and the remainder is so thickened or polymerized that a sample thereof when cooled to room temperature has a softening point (ball and ring) of 130–180° F. At that stage the mass is cooled to room temperature and will be found to be a thermoplastic and substantially solid resinous mass soluble in furfural and hereinafter known as Material IIK–H1. The distillates were combined and are known as Material IIK–H2.

To 100 parts of said Material IIK–H2 calculated on a dry basis and being either in combination with the water or dehydrated, was added 8 parts of diethyl sulphate. The mix was heated to and maintained at 280° F. until a sample thereof had a viscosity at 25° C. approximately 10 times that of the original Material IIK–H2 in dehydrated state, and this thickened or polymerized product is hereinafter known as Material IIK–H3, is soluble in furfural and is in the liquid state.

To 100 lbs. of Product IIK–H is added 2 lbs. of an aqueous solution consisting of 1 lb. of sulfuric acid in an equal quantity of water. The mix is heated to and maintained at 325° F. until the viscosity at 25° C. of a solution of a 10-gram sample thereof in 5 grams of furfural is 2 times that of a solution of a 10-gram sample of the original Material IIK–H in 5 grams of furfural. Then the acidic agent is neutralized and cooled to room temperature. The so-thickened or polymerized mass is soluble in furfural and is liquid at 180° F. and is known as Material IIK–H4.

All of the specific Materials (II) of the foregoing Examples A–H have a softening point (ball and ring) no greater than 200° F. and are soluble in furfural.

In the course of our experimentation with Materials (II), some examples of which are Materials (IIA)–(IIG), we have discovered that Materials (II) are compatible with Materials (I) hereinafter defined and that such combinations found application in a number of different and unrelated fields. We further discovered that Materials (II) and Materials (I) are compatible over a wide range of different proportions and are capable of being used as such and also capable of simultaneous and concurrent polymerization or copolymerization. The ratio by weight of Materials (I) to (II) is generally in the range of 100–5 parts of (I) to 5–100 parts of (II). Concurrent and simultaneous polymerization or copolymerization is effected by employing an acidic catalyst in mixture therewith to provide a mix whose pH is 0.3–3.5.

The various novel compositions of this invention, when in the infusible state find application as friction augmenting particles in frictional elements, such as brake linings and clutch facings, and when in the fusible state with the aid of a catalyst and/or aldehyde find application as a binding material in such elements wherein such fusible combinations when so employed are homopolymerized or reacted with the aldehyde to become converted into a strong, infusible binder having good frictional properties. All of the compositions of this invention, which have a softening point (ball and ring) no greater than about 250° F. or are soluble in an organic solvent, such as methyl ethyl ketone, acetone, furfural, or toluol, etc., may be employed as insecticides or fungicides, and for such purposes may be dissolved in an appropriate solvent or dispersed in a soap-water carrier, or may be combined with other insecticides, such as DDT, rotenone, or pyrethrum and acts synergistically therewith, or may be combined with Materials (III) to act as a plasticizer therefor, to form gels therewith and/or to form extrudable compositions for the production of tubings, etc., useful as coverings, electrical insulation, etc., or with or without Materials (III) may be combined with Materials (IV) to impart thereto good ozone resistance, tear strength, tensile strength and good heat aging properties, or they may be used as so-called cold setting cements and for this purpose, when not in the liquid state may be thinned with a reactable solvent such as furfural or with a nonreactable solvent, and generally combined with a filler, such as sand, finely divided carbon, barium sulphate, etc., carrying a catalyst such as paratoluene sulphonic acid.

According to this invention, one or a combination of two or more of said Materials (II) heretofore disclosed and some examples of which are set forth in Examples A–H are combined with one or a combination of two or more Materials (I) with or without other materials, some examples of which are Materials (III) and/or Materials (IV).

The Materials (I) are all liquid at 200° F. and selected from the group consisting of (a) monomeric and polymeric furfural-ketone organic reaction products produced by reacting furfural and a ketone having at least two hydrogen atoms on an alpha carbon; (b) monomeric and polymeric monofurfurylidene ketone; (c) monomeric and polymeric difurfurylidene-ketone; (d) residues obtained by heat distillation of (a) and measuring by weight at least 60% of the weight of (a); (e) polymerized (d); (f) organic reaction products of (a)–(e) respectively with an aldehyde; (g) partially hydrogenated products obtained by combining with (a)–(f) respectively amounts of hydrogen equal to about 15%–65% of that required to saturate all of the carbon to carbon double bonds therein; (h) residues obtained by the heat distillation of said partially hydrogenated (a) and of said partially hydrogenated (f) respectively, said residues measuring by weight at least 60% of that of (a) and (f) respectively; (i) organic reaction products of an aldehyde with (g) and (h) respectively; (j) furfuryl alcohol-formaldehyde; (k) formaldehyde-organic condensation products of furfuryl alcohol; and (l) mixtures of at least two of (a)–(k).

Reference is hereby made to U.S. Patents 2,600,403, 2,565,685, 2,363,829, 2,343,972 and 2,343,973, disclosing Materials (I) and all of which may be employed in the practice of this invention.

Materials (III) are normally solid polymers of esters, such as vinyl chloride, vinylacetate, etc., normally solid polymers of vinylidene chloride, normally solid copolymers of vinylacetate and vinylchloride, and acrylonitrile and vinylidene chloride, etc., and normally solid polyvinyl acetals such as polyvinyl formal, polyvinyl acetal, etc., normally solid cellulose ethers, such as ethyl cellulose, methyl cellulose, etc.

Materials (IV) are natural rubber, reclaimed rubber, as well as so-called synthetic rubbers, such as normally solid homopolymers of butadiene 1,3, neoprene, polymerized ethylene polysulphide, copolymers of butadiene 1,3 and acrylonitrile and copolymers of styrene and butadiene, 1,3.

The following are some examples of this invention and are given by way of illustration and not limitation, all parts being given by weight unless otherwise specified.

*Example 1*

(I) 150 grams of furfural-acetone organic reaction product identified as Product A in Example 1 of U.S. 2,600,403 and (II) 200 grams of 2,3,4,5-bis ($\Delta^2$-butenylene)-tetrahydro furfural were mixed together to provide novel Product 1a and while being stirred there was added thereto a solution consisting of 7.5 grams of sodium hydroxide in 15 grams of water. While the mix of Product 1a and sodium hydroxide is being constantly stirred, it is heated to a temperature of 100° C. and held at that temperature until a sample thereof, when cooled to room temperature, is substantially solid and has a softening point (ball and ring) of 130° F. This novel product is hereinafter known as Product 1b. Either product 1a or Product 1b may be dissolved in an organic solvent such as methyl ethyl ketone, and such solution may be employed as a coating for a metal base or the like, after which it is heated to drive off the solvent and further heated to a temperature of approximately 450° F. to provide a resistant coating. If desired, such Product 1a or Product 1b may be heat reacted with an aldehyde such as paraformaldehyde in the presence of either an acidic catalyst such as diethyl sulfate, sulphuric acid or the like or an alkaline catalyst such as sodium hydroxide to provide reaction products in their intermediate state, having softening point (ball and ring) of 190° F. and known as Product 1c. Product 1c may be combined with any of the insecticides disclosed in this application or they may be dissolved in organic solvent, such as methylethyl ketone and such solution may be spread on the base to be coated and/or impregnated, and then the solvent is driven off and the organic reaction product is further heated to higher temperatures whereupon said reaction product, Product 1c, is converted to the infusible state.

*Example 2*

(I) 95 grams of Fraction II disclosed in Example 1 of U.S. Patent 2,600,403 and termed therein difurfural acetone, and 5 grams of Fraction I disclosed in Example 1 of U.S. Patent 2,600,403 and termed furfural-acetone therein, and (II) 100 grams of Material IIK-A were mixed together for solution to provide Product 2a. While being constantly stirred, there was added to Product 2a 6 grams of diethyl sulfate and the mixture was heated to a temperature of approximately 100° C. and maintained at that temperature until the softening point (ball and ring) of the mass is 180° F. and the mass was such that its viscosity at 25° C. measured at least 10 times that of the original combination of components (I) and (II). The mass is then neutralized, and the resultant product thus produced is hereinafter known as Product 2b. Products 2a and 2b respectively may be combined with Materials (III) and/or (IV) to produce various gels and to improve the ozone resistance tear strength and the aging and tensile characteristics of Material (IV).

*Example 3*

(I) 100 grams of Product A disclosed in U.S. Patent 2,600,403.

(II) 100 grams of Material IIK-C and 150 grams of furfural were mixed together providing a substantially homogeneous solution. Then to 50 parts of said solution was added 100 grams of Material V finely divided calcined petroleum carbon (finer than 100 mesh) and produced by combining 200 parts of such carbon with 6 parts of paratoluene sulphonic acid, with the latter carried thinly and uniformly distributed therethrough. The components were mixed together and the resultant mass was employed as a coating on wood or on concrete floors or the like, and allowed to remain thereon. After 48 hours at room temperature this coating, which actually is a cold setting cement, was converted into a dense chemically resisting solid coat.

*Example 4*

(I) 150 grams of mesityl oxide-furfural organic reaction product and specifically of that known as Product A in Example A of U.S. Patent 2,565,685 and (II) 400 grams of IIK-D1 were warmed together for solution to provide novel Product 4a and then there was added thereto 30 grams of fluoboric acid solution (47% concentration). The mass was constantly stirred and heated to a temperature of approximately 225° F. until a sample thereof, at room temperature, was a substantially solid fusible brittle button. If desired, the mass may be poured into pans and placed in an oven at 150° C. and permitted to remain therein for a period of 24 hours. At the end of that time the mass is in the infusible state and may be comminuted to fine powder or dust and employed as friction augmenting particles in brake linings and clutch facings. If desired, the mass, when a sample is a fusible brittle button but still thermoplastic, or Product 4a may be employed with Materials (III) and/or (IV) to provide gels with the former and with the latter to act as a plasticizer and to impart ozone resistance, good aging, good tear strength as well as high tensile strength thereto.

*Example 5*

(I) 100 parts of partly hydrogenated furfural-acetone reaction mass disclosed in U.S. Patent 2,600,403 and identified therein as Product HA.

(II) 200 grams of 2,3,4,5-bis-($\Delta^2$ butenylene)-tetrahydrofurfural were mixed together to provide a substantially homogeneous solution, known as Product 5. Then to said solution was added 10 grams of sulphuric acid in concentration). The mass was constantly stirred and heated to a temperature of about 100° C. to obtain a resultant product having a different viscosity with the viscosity of the product increasing as the time of heating increased. In this manner there have been obtained Materials (I) and (II) coupled together and having a viscosity ranging from the very low viscosity of Product 5 to substantially solid infusible and brittle mass, all of which copolymerization products are known as Products 5a. Product 5 and Products 5a when in the liquid state, are particularly suitable as insecticides useful either alone or in combination with other insecticide herein disclosed, and they also may be employed as plasticizers for Materials (III) and (IV). Such Products 5a, when in the normally solid but fusible state and having a softening point (ball and ring) of approximately 130–210° F. may be compounded with Materials (IV) to impart thereto the characteristics set forth in Example 3. The Product 5, when in the substantially infusible state, may be comminuted and employed as a friction augmenting material in brake linings and clutch facings.

Example 6

(I) 200 grams of component (I) in Example 4 and 100 grams of component (I) disclosed in Example 5, (II) 100 grams of IIK–C and 100 grams of furfural were all mixed together and to 50 grams of Material (V) disclosed in Example 3 herein. These components were mixed together and employed as a cold setting cement, which when cured at room temperature, was found to have excellent chemical resistance.

Example 7

(I) 100 grams of Product HA as identified in Example 5 herein were polymerized under acidic conditions to a viscosity of 10 times that of Product HA at 25° C., and (II) 100 grams of IIK–F were warmed together to obtain a substantially homogeneous solution. Then to said solution was added 6 grams of sulphuric acid in 12 grams of water and the temperature of the mass was increased to about 150° C. and held to remain at that temperature for a period of approximately 24 hours. At the end of that period the mass was found to be converted into a substantially solid, substantially infusible mass which is comminuted, and the resultant powder or dust finds application as friction augmenting materials in brake linings or clutch facings.

Exmple 9

(I) 5 grams of Product HA–1 and 95 grams of Product HA–2 identified in Example 1A of U.S. Patent 2,600,403, and are respectively partially hydrogenated monofurfural acetone and difurfural acetone, and 50 grams of (II) Material IIK–F were warmed together for a solution. Then there was added thereto 5 grams of diethylsulphate which was uniformly distributed therethrough. The mass was heated to a temperature of approximately 225° F. and maintained at that temperature until the viscosity at 25° C. of a solution consisting of 5 parts thereof dissolved in 10 parts of furfural measured about 10 times that of a solution consisting of 5 parts of said original before heating in 10 parts of furfural. Then cool rapidly and neutralize with 5 grams of lime. The resultant is known as Product 9, which may be combined with Materials (III) to produce gels or with or without one or more insecticides described to provide novel insecticidal components.

Example 10

(I) 200 grams of Product HA–2 disclosed in Example 1A of U.S. Patent 2,600,403 and polymerized in the manner described in said patent to a viscosity at 25° C. equal to 10 times the viscosity of said HA–2 in 25° C.

(II) 100 grams of Material IIK–C were mixed together and then there was added thereto 9 grams of diethyl sulphate which was uniformly distributed therethrough, the mass was maintained at a tempearture of approximately 225° F. until a sample thereof when cooled to room temperature was a substantially solid fusible button. The mass was immediately neutralized and cooled to room temperature. This solid product, known as Product 10, may be broken up into pieces which may be compounded with Materials (IV) to improve their ozone resistance, heat aging property, tear strength and tensile strength.

Example 11

(I) 100 grams of the so-called "viscous, fusible resin" produced by reacting formaldehyde with furfural-acetone reaction product as disclosed in Example 1 of U.S. Patent 2,363,829.

(II) 100 grams of Material IIK–G1 were warmed together and then there was added thereto 6 grams of sulphuric acid in 12 grams of water, with stirring. This mass was placed in an oven at 150° C. and maintained therein for a period of about 24 hours. At the end of that period the mass was found to be in the substantially solid and infusible state. It was comminuted into a fine powder or dust, and such powder or dust finds application as friction augmenting particles in brake linings and clutch facings.

Example 12

(I) 50 grams of furfuryl alcohol-formaldehyde resinous organic reaction product disclosed in Example 3 of U.S. Patent No. 2,343,972.

(II) 200 grams of Material IIK–A were warmed together for solution. Then there was added thereto 6 grams of diethyl sulphate which was mixed therewith. The mass was placed in an oven maintained at a temperature of 150° C. and allowed to remain therein for 24 hours, after which it was found to be substantially solid and infusible. This mass was comminuted into a powdery condition, and may be employed as friction augmenting particles in brake linings and clutch facings.

Example 13

Employing the same procedure and components as those set forth in Example 12, except that for the furfuryl alcohol-formaldehyde resin therein there were substituted the entire yield of resin disclosed in Example 5 of U.S. Patent No. 2,343,973, which is described in said example as being very thick and tacky and soluble in equal parts of alcohol.

Example 14

(I) 10 grams of component (I) of Example 12, 5 grams of component (I) of Example 1 together with 85 grams of component (I) of Example 5 and (II) 100 grams of Material IIK–C were mixed together and there was added thereto 350 grams Material V, identified in Example 3. These components were mixed together and employed as a cement, which when cured was found to have excellent chemical resistance.

The combinations of this invention, namely, combinations of one or more of Materials (I), together with one or more of Materials (II) copolymerized or not and either unreacted with or reacted with an aldehyde, examples of which are formaldehyde and its polymers, furfural, glyoxal, etc., find application as components in friction elements, such as brake linings and clutch facings. Those which are in the infusible state and comminuted into a fine powder or dust find particular application as friction augmenting particles in such friction elements. It is understood that the other copolymerization products in other examples herein which have not been converted to the solid and infusible state may with the addition of additional catalyst thereto be maintained in an oven at 150° C. for 24 hours to convert them to the substantially solid and infusible state and then comminuted into a fine powder or dust and also may be used as friction augmenting particles in friction elements. The combinations of Materials (I) and (II) in the illustrative proportions set forth in Examples 1–14 and without the employment of any catalyst may be combined with Materials (III) and/or Materials (IV), also copolymerization products of Materials (I) and (II) which either as such or the aldehyde reaction products thereof which have a melting point (ball and ring) no greater than approximately 210° F., examples of which are Product 1b, Product 1c, Product 2b, such Product 5 having a softening point (ball and ring) of 130–210° F., Product 9 having a softening point (ball and ring) of 130–210° F., Product 10 having a softening point (ball and ring) of 130–210° F., may be combined with Materials (III) and/or Materials (IV) to provide a wide variety of different materials finding application in a variety of different fields. In general, the ratio by weight of either the uncopolymerized combination of Materials (I) and (II) or the copolymerization products of Materials (I) and (II) either unreacted with or reacted with an aldehyde and in any case having a softening point (ball and ring) no greater than 210° F. to Materials (III) or (IV) is 100 parts by weight of the former to 2–100 parts of the latter, or 5–100 parts of the former to 100 parts of the latter, depending upon the end product desired, and for example, 100 parts of the former together with 20 parts of Material (III) may be heated together at 250° F. until solution takes place and then is cooled to provide a gel which may be compounded with Material (IV) or used for other purposes.

Also said combinations of Materials (I) and (II) either uncopolymerized or copolymerized with each other and either reacted with or unreacted with an aldehyde and in any case having a softening point (ball and ring) no greater than 210° F. find application as insecticides and fungicides used either alone or together with an insecticide such as rotenone, pyrethrum, DDT, etc. and when together with such other insecticides act synergistically therewith. Such products with or without said other insecticides may be dispersed in soap-water solution of dissolved or dispersed in other carrier which may be an organic solvent, etc.

Since certain changes in carrying out the aforesaid processes and certain modifications in the compositions which embody the invention may be made without departing from its scope, it is understood that all matter contained in the description shall be interpreted as illustrative and not in a limiting sense.

It is also to be understood that the following claims are intended to cover all the generic and specific features of the invention, which as matter of language might be said to fall therebetween; and that they are intended to be inclusive in scope and not exclusive, in that, if desired, other materials may be added to our novel compositions of matter herein claimed without departing from the spirit of the invention. Particularly it is to be understood that in said claims, ingredients or components recited in the singular are intended to include compatible mixtures of said ingredients wherever the sense permits.

This application is a continuation in part of our copending application Serial No. 360,827 filed June 10, 1953, and now being Patent No. 2,816,086 issued on December 10, 1957.

Having thus described the invention, what we claim is:

1. A novel composition of matter comprising (II) butadiene-furfural organic reaction product having a softening point (ball and ring) no greater than 200° F. intimately combined with (I) a material liquid at 200° F. and selected from the group consisting of (a) furfural-ketone organic reaction products produced by reacting furfural and a ketone having at least two hydrogen atoms on an alpha carbon; (b) polymers of (a); (c) organic reaction products produced by reacting (a) with an aldehyde; (d) organic reaction products produced by reacting (b) with an aldehyde; (e) partially hydrogenated products obtained by combining with (a)–(d) respectively amounts of hydrogen equal to about 15%–65% of that required to saturate all of the carbon to carbon double bonds therein; and (f) organic reaction products produced by reacting (e) with an aldehyde.

2. A novel composition of matter comprising (II) butadiene-furfural organic reaction product having a softening point (ball and ring) no greater than 200° F. intimately combined with (I) an organic reaction product produced by reacting furfural and a ketone having at least two hydrogen atoms on an alpha carbon.

3. A novel composition of matter comprising (II) butadiene-furfural organic reaction product having a softening point (ball and ring) no greater than 200° F. intimately combined with (I) partially hydrogenated monofurfurylidene-acetone produced by combining with monofurfurylidene-acetone hydrogen in amount equal to about 15%–65% of the amount of hydrogen necessary to completely saturate all of the carbon to carbon double bonds thereof.

4. A novel composition of matter comprising (II) butadiene-furfural organic reaction product having a softening point, ball and ring) no greater than 200° F. intimately combined with (I) partially hydrogenated difurfurylidene-acetone produced by combining with difurfurylidene-acetone hydrogen in amount equal to about 15%–65% of the amount of hydrogen necessary to completely saturate all of the carbon to carbon double bonds thereof.

References Cited in the file of this patent

UNITED STATES PATENTS

| | | |
|---|---|---|
| 2,343,972 | Harvey | Mar. 14, 1944 |
| 2,363,829 | Caplan et al. | Nov. 28, 1944 |
| 2,483,903 | Herbolsheimer | Oct. 4, 1949 |
| 2,600,403 | Harvey | June 17, 1952 |

OTHER REFERENCES

Hillyer: Ind. Eng. Chem., November 1948, pages 2216–2220.